(12) United States Patent
Ito et al.

(10) Patent No.: US 6,527,628 B2
(45) Date of Patent: Mar. 4, 2003

(54) METHOD FOR PRODUCING FROST GLASS PRODUCT

(75) Inventors: Yuuzi Ito, Aichi (JP); Hiroshi Kawai, Aichi (JP)

(73) Assignee: Ishizuka Glass Kabushiki Kaisha, Aichi (JP)

( * ) Notice: Subject to any disclaimer, the term of this patent is extended or adjusted under 35 U.S.C. 154(b) by 0 days.

(21) Appl. No.: 09/791,582

(22) Filed: Feb. 26, 2001

(65) Prior Publication Data

US 2002/0164933 A1 Nov. 7, 2002

(51) Int. Cl.$^7$ ................................. B24C 1/04
(52) U.S. Cl. ............... 451/57; 451/29; 451/38
(58) Field of Search ............... 451/57, 38, 40, 451/29, 30, 31, 75

(56) References Cited

U.S. PATENT DOCUMENTS

| | | | | |
|---|---|---|---|---|
| 394,612 A | * | 12/1888 | Ripley | 451/29 |
| 1,431,917 A | * | 10/1922 | Antaramian | 451/29 |
| 4,801,490 A | * | 1/1989 | Schuette | 451/29 |
| 5,983,434 A | | 11/1999 | Eichinger et al. | 15/180 |

FOREIGN PATENT DOCUMENTS

| | | | | |
|---|---|---|---|---|
| DE | 229859 | * | 11/1985 | 451/31 |
| JP | 353136789 | * | 11/1978 | 451/28 |
| JP | 356015399 | * | 2/1981 | 451/29 |
| JP | 359030669 | * | 2/1984 | 451/31 |
| JP | 361004669 | * | 1/1986 | 451/31 |
| WO | WO 95/14552 | | 6/1995 | |

OTHER PUBLICATIONS

"Polishing of Glass" by Hata Chemi et al., vol. 110, No. 6, Feb. 6, 1989, p. 297 XP000018384, ISSN: 0009–2258 Chemical Abstract+Indexes, US, American Chemical Society, Columbus, OH.
"Neues Verfahren Fur Die Flaschenmattierung", vol. 87, No. 6, Feb. 17, 1995, pp. 6 & 8 XP000497826, ISSN: 1023–0823 Technische Rundschau, CH, Hallwag Verag. Bern.
European Search Report dated Jul. 30, 2001.

* cited by examiner

Primary Examiner—Robert A. Rose
(74) Attorney, Agent, or Firm—Rader, Fishman & Grauer PLLC

(57) ABSTRACT

The present invention provides a method for producing a frosted glass product, where a sand blast processing using a powder class abrasive and a brush polishing treatment are performed and thereby appearance and touch feeling equal to those of a product worked by the chemical frost processing can be attained. In particular, the present invention provides a method for producing a frosted glass product, which is safe in the work and at the same time, mild to the environment. The invention is a method for producing a frosted glass product, which is a method for obtaining a glass product having a delustered surface such that the surface roughness Ra of the glass is from 0.4 to 1.2 $\mu$m, the method comprising a step of sand-blasting a glass surface using an abrasive having a grain size of less than #220, and a step of brush-polishing the sand-blasted surface.

12 Claims, No Drawings

METHOD FOR PRODUCING FROST GLASS PRODUCT

BACKGROUND OF THE INVENTION

1. Field of the Invention

The present invention relates to a method for producing a frosted glass product, where a glass-made packaging container such as glass bottle, a glass-made table service (tableware) such as cups and dishes, or a glass-made decoration is subjected to a frost processing to form a delustered surface.

2. Description of the Related Art

The frost processing for working the surface of a glass product into a fog-like delustered surface is roughly classified into a chemical method and a mechanical method. Of these, the chemical method is called chemical frosting (or chemical frost processing) and representative examples thereof include (1) a method of mixing a hydrofluoric acid, a fluorine compound or an acid, non-uniformly corroding the glass surface to generate fine recessed faces, and thereby forming a frosted surface. On the other hand, representative examples of the mechanical method include (2) a method called sand blasting (or sand blast processing) of blowing $Al_2O_3$ (called "alundum"), SiC (called "carborundum") or quartz sand to roughen the surface. Other examples include (3) a method of mixing silica powder or the like with a heat-curable resin or a photocurable resin, such as urethane resin, and coating the mixture on the surface of a glass product to obtain a frosted surface, (4) a method of coating and baking a coating material mainly comprising an alkoxy silane, and (5) a method of coating and baking a particulate silica or a metal oxide using a low melting point glass as the binder.

Among these, the method most commonly used for the production of a frosted glass product is the etching method (1) using a hydrofluoric acid, however, since a large amount of a hydrofluoric acid giving rise to the environmental pollution is dealt with, this method is not preferred for workers in view of labor safety and hygiene and a countermeasure must be taken for individual cases. The method (2) has a problem in that since the surface of the glass substrate is roughened by mechanically scratching it, coarse asperities are formed on the glass surface to give bad touch feeling. In other words, the glass product obtained by conventional sand-blast processing clearly differs from the product by the chemical frost processing in that the touch feeling is rough, to say nothing of the appearance. The method (3) of forming an organic material film is in need of improvement because the heat resistance and the surface hardness are low. The method (4) is disadvantageous in that a thick film cannot be formed and due to the use of an organic solvent, the work environment is bad. Also, the method (5) is disadvantageous in that glass powder and a solvent must be mixed for a long time in a pot mill at the time of producing a coating material and in the case of using an organic solvent, environmental pollution and bad working environment arise as problems and handling of the coating material requires great care. As such, each processing method has the above-described defects and therefore, a processing method ensuring touch feeling equal to that in the chemical frost, safe working and mildness to the environment is being demanded.

SUMMARY OF THE INVENTION

By taking account of these problems, the present invention provides a method for producing a frosted glass product, where a sand blast processing using a powder class abrasive and a brush polishing treatment are performed and thereby appearance and touch feeling equal to those of a product worked by the chemical frost processing can be attained. In particular, the present invention provides a method for producing a frosted glass product, which is safe in the work and at the same time, mild to the environment.

The invention of claim 1 is a method for producing a frosted glass product, which is a method for obtaining a glass product having a delustered surface such that the surface roughness Ra of the glass is from 0.4 to 1.2 $\mu$m, the method comprising a step of sand-blasting a glass surface using an abrasive having a grain size of less than #220, and a step of brush-polishing the sand-blasted surface.

The invention of claim 2 is the method for producing a frosted glass product as described in claim 1, which comprises a step of water-washing the brush-polished surface.

The invention of claim 3 is the method for producing a frosted glass product as described in claim 1, wherein the brush-polishing treatment is performed while splashing water.

The invention of claim 4 is the method for producing a frosted glass product as described in claim 1, wherein the abrasive is $Al_2O_3$ or SiC having a grain size of #400 to #500.

The invention of claim 5 is the method for producing a frosted glass product as described in claim 2, wherein the abrasive is $Al_2O_3$ or SiC having a grain size of #400 to #500.

The invention of claim 6 is the method for producing a frosted glass product as described in claim 3, wherein the abrasive is $Al_2O_3$ or SiC having a grain size of #400 to #500.

The invention of claim 7 is the method for producing a frosted glass product as described in claim 1, wherein the brush-polishing treatment is performed by a nylon brush having mixed thereinto an abrasive having a grain size of #320 to #500.

The invention of claim 8 is the method for producing a frosted glass product as described in claim 2, wherein the brush-polishing treatment is performed by a nylon brush having mixed thereinto an abrasive having a grain size of #320 to #500.

The invention of claim 9 is the method for producing a frosted glass product as described in claim 3, wherein the brush-polishing treatment is performed by a nylon brush having mixed thereinto an abrasive having a grain size of #320 to #500.

The invention of claim 10 is the method for producing a frosted glass product as described in claim 4, wherein the brush-polishing treatment is performed by a nylon brush having mixed thereinto an abrasive having a grain size of #320 to #500.

The invention of claim 11 is the method for producing a frosted glass product as described in claim 5, wherein the brush-polishing treatment is performed by a nylon brush having mixed thereinto an abrasive having a grain size of #320 to #500.

The invention of claim 12 is the method for producing a frosted glass product as described in claim 6, wherein the brush-polishing treatment is performed by a nylon brush having mixed thereinto an abrasive having a grain size of #320 to #500.

DETAILED DESCRIPTION OF THE PREFERRED EMBODIMENTS

The present invention is described in detail below.

In the present invention, the appearance and touch equal to those of a glass product worked by the chemical frost processing means a delustered surface where the glass surface roughness Ra is from 0.4 to 1.2 μm. If the glass surface roughness Ra is less than 0.4 μm, the transparency is excessively high and the high-grade effect is lost, whereas if it exceeds 1.2 μm, appearance, touch feeling and the transfer paper printability becomes worse. The Ra of the delustered surface is most preferably from 0.5 to 0.9 μm.

The construction material of the abrasive for use in the present invention may be any as long as it can render the glass surface foggy and examples thereof include ceramics and glass. With respect to the grain size, a powder class abrasive of less than #220 may be used. $Al_2O_3$ #220 generally used in the sand-blast processing gives a coarse glass surface having a surface roughness Ra of about 2.0 μm. If the grain size is large, SiC and other abrasives similarly form large asperities on the surface, whereas if the grain size is small, although small asperities may be formed on the surface, the processing time is prolonged. Steel is not preferred because the processing takes a long time and even if the grain size is reduced, fine irregularities cannot be formed and a large Ra results. With the same grain size, SiC and glass bead give a larger Ra than $Al_2O_3$ and therefore, these preferably have a smaller grain size. $Al_2O_3$ and SiC having a grain size of #400 to #500 are preferred as the abrasive because an objective surface roughness Ra of 1.0 μm or less is easily obtained and the processing rate is high.

The abrasives for use in the present invention have a grain size shown below.

| Grain Size Number | Average Grain Size (μm) |
| --- | --- |
| #240 | 80 |
| #280 | 67 |
| #320 | 57 |
| #400 | 40 |
| #500 | 35 |
| #600 | 28 |

The surface roughness Ra of about 1.0 μm comparable to that in the chemical frost processing may be obtained only by the sand-blast processing (for example, sand-blast processing using an abrasive $Al_2O_3$ #400).

However, after the sand-blast processing, fine glass powder is adhering to the treated surface of a glass product and powdery feeling remains. Furthermore, a large number of fine cracks are present and whitish appearance is noticeable. Therefore, a secondary treatment is indispensable. In the present invention, the sand-blasted surface is brush-polished as the secondary treatment, whereby appearance and touch feeling comparable to those in the chemical frost processing can be obtained.

In the present invention, the brush polishing is performed by pressing the glass surface to a rotating brush but the brush-polishing treatment is not limited to this method. The construction material of the brush is not particularly limited but an abrasive-mixed nylon brush is preferred because of its high working speed.

The abrasive mixed into the nylon brush may be any as long as the grain size is as small as #240 or less, however, for slightly polishing the surface, an abrasive of #320 to #500 is preferred.

After the brush-polishing treatment, the glass surface is water washed (cleaned) and thereby fine glass powder can be completely removed. This water washing may be performed at the same time with the brush-polishing treatment, namely, the brush-polishing treatment may be performed while splashing water. The water at ordinary temperature can be used but the water at the temperature of approximately 50° C. is preferred because of its easiness of drying the glass surface after the water washing.

The frosted glass product obtained by the present invention has small surface asperities and therefore, is advantageous in that printing with ceramic paint or organic paint and transfer paper printing can be performed and the latitude of design expands.

EXAMPLES

Using a plain glass plate having a plate size of 75×30×2 mmt, the surface roughness was examined by varying the abrasive. In the sand-blast processing, the shot air pressure was 3.5 kg/cm². The results obtained are shown in Table 1 below.

TABLE 1

| Abrasive Grain | Ra (μm) | $\overline{X}$ |
| --- | --- | --- |
| A#220 | 1.86, 2.05 | 1.96 |
| C#220 | 1.92, 1.93 | 1.93 |
| B#300 | 2.75, 2.91 | 2.83 |
| B#400 | 1.35, 1.55 | 1.45 |
| S#400 | 6.36, 4.19 | 5.28 |
| A#400 | 1.12, 0.97 | 1.05 |
| C#400 | 1.57 | 1.57 |

A: $Al_2O_3$,
C: SiC,
B: Glass Bead,
S: Steel

It is seen from the results above that the glass bead and steel are not suitable as the abrasive and the grain size of the abrasive is preferably #400 or less.

Using the same plain glass plate as above, a product sand-blasted with $Al_2O_3$ #400 was prepared and thereafter, subjected to a secondary treatment by variously changing the treatment. Then, the surface roughness, the glass powder removing effect and the touch feeling were examined. The results obtained are shown in Table 2. Here, when the same plain glass plate was frosted with the conventional chemical frost processing, the surface roughness Ra was 0.84 μm. Also, the $Al_2O_3$ #400 sand-blasted product itself (before the secondary treatment) had a surface roughness Ra of 0.99 μm. From these results, it is verified that the brush polishing treatment as the secondary treatment has a high effect of removing glass powder and ensures touch feeling equal to that of a product by the chemical frost processing.

TABLE 2

| No. | Secondary Treatment | Ra (μm) | Glass Powder Removing Effect | Touch |
| --- | --- | --- | --- | --- |
| 1 | sand-blasting | | | |
|  | (1) B#400 | 1.08 | X | X |
|  | (2) S#400 | 3.97 | X | X |
| 2 | Heating (electric furnace) | | | |
|  | 650° C., 15 min. | 0.8 | X(deformed) | X |
|  | 600° C., 15 min. | 0.97 | X | X |
| 3 | flame baking by burner | 0.98 | X | X |
| 4 | ultrasonic cleaning Room temperature, 1 min. | 0.8 | ○ | Δ |

TABLE 2-continued

| No. | Secondary Treatment | Ra (μm) | Glass Powder Removing Effect | Touch |
|---|---|---|---|---|
| | room temperature, 5 min. | 0.93 | ○ | Δ |
| 5 | brush polishing | vertical/horizontal | | |
| * | Ny | 0.78/0.78 | ○ | ○ |
| ** | Ny#500 | 0.71/0.74 | ○ | ○ |
| ** | Ny#320 | 0.82/0.85 | ○ | ○ |
| 6 | alkali washing (80° C.) 20%, 30 min. | 0.8 | Δ | Δ |

○: effective,
Δ: slightly effective,
X: not effective.
*: nylon brush,
**: abrasive-mixed nylon brush.

Examples are described below.

Example 1

A glass surface of a plain tumbler to be treated was sand-blasted using $Al_2O_3$ #400, then brush-polished by a nylon brush (mixed with an abrasive of #500) and thereafter water washed. The tumbler was finished to have a frost-like appearance and the surface roughness Ra was 0.71 μm. Furthermore, both the appearance and the touch feeling were equal to those of a chemical frosted product.

Example 2

A glass surface of a plain tumbler to be treated was sand-blasted using $Al_2O_3$ #400 and then brush-polished by a nylon brush (mixed with an abrasive of #320) while splashing water, and subsequently the tumbler was finished to have a frost-like appearance. As a result, the surface roughness Ra was 0.80 μm and both the appearance and the touch feeling were equal to those of a chemical frosted product.

Example 3

A glass surface of a plain tumbler to be treated was sand-blasted using $Al_2O_3$ #500, then brush-polished by a nylon brush and thereafter water washed, and subsequently the tumbler was finished to have a frost-like appearance. As a result, the surface roughness Ra was 0.80 μm, and both the appearance and the touch feeling were equal to those of a chemical frosted product.

Example 4

A glass surface of a plain tumbler to be treated was sand-blasted using SiC #500, then brush-polished by a nylon brush (mixed with an abrasive of #600) and thereafter water washed, and subsequently the tumbler was finished to have a frost-like appearance, the surface roughness Ra was 0.76 μm and both the appearance and the touch feeling were equal to those of a chemical frosted product.

Comparative Example 1

A conventional sand-blasted product was prepared, namely, a plain tumbler was sand-blasted using $Al_2O_3$ #220 and air-blown to obtain a frost-processed tumbler. The surface roughness Ra was 1.96 μm, the appearance was whitish and the touch feeling was rough.

Comparative Example 2

A plain tumbler was sand-blasted using $Al_2O_3$ #400 and air-blown to obtain a frost-processed tumbler. The surface roughness Ra was 1.05 μm, the appearance was whitish and the touch feeling was slightly coarse while perceiving residual powder.

TABLE 3

| | Example | | | | Comparison | |
|---|---|---|---|---|---|---|
| | 1 | 2 | 3 | 4 | 1 | 2 |
| *1)Abrasive grain for sand-blasting | A#400 | A#400 | A#500 | C#500 | A#220 | A#400 |
| Nylon brush | Ny#500 | Ny#320 | Ny, no abrasive grain | Ny#600 | — | — |
| Brush washing | dry | wet | dry | dry | — | — |
| Water washing | washed | not washed | washed | washed | air-blown | air-blown |
| Surface roughness Ra (μm) | 0.71 | 0.80 | 0.80 | 0.76 | 1.96 | 1.02 |
| *2)Appearance (with an eye) | good | good | good | good | Adherence of white powder | Adherence of white powder |
| *3)Touch feeling (by a finger) | good | good | good | good | coarse | Slightly coarse |

*1)A: $Al_2O_3$, C: SiC
*2) *3): Comparison with chemical frosted product.

For examining the transfer paper printability, the following Examples were performed.

Example 5

A glass surface of a plain tumbler to be treated was sand-blasted ($Al_2O_3$ #400), brush-polished by a nylon brush (mixed with an abrasive of #500) and then water washed. Thereafter, transfer paper was wetted with water, attached to the tumbler and dried for 12 hours until the transfer paper was completely dried. Then, the tumbler was placed in an electric furnace, the temperature was elevated from room temperature to 580° C. and at this temperature, the tumbler was kept for 10 minutes and thereby printed. The tumbler was allowed as it is to cool to room temperature in the electric furnace and then taken out as a product of Example 5.

Example 6

A glass surface of a plain tumbler to be treated was sand-blasted ($Al_2O_3$ #400) and then brush-polished by a nylon brush (mixed with an abrasive of #320) while splashing water. Thereafter, the tumbler was treated in the same manner as in Example 5 to obtain a product of Example 6.

Comparative Example 3

A glass surface of a plain tumbler to be treated was sand-blasted ($Al_2O_3$ #220) and then water washed. Thereafter, the tumbler was treated in the same manner as in Example 5 to obtain a product of Comparative Example 3.

Comparative Example 4

A glass surface of a plain tumbler to be treated was sand-blasted ($Al_2O_3$ #400) and then water washed. Thereafter, the tumbler was treated in the same manner as in Example 5 to obtain a product of Comparative Example 4.

Comparative Example 5

A transfer paper wetted with water was attached to an acid frost-processed tumbler and thereafter, the tumbler was treated in the same manner as in Example 5 to obtain a product of Comparative Example 5. The printed state of each product was evaluated with an eye and the results obtained are shown in Table 4.

TABLE 4

|  | Example | | Comparison | | |
| --- | --- | --- | --- | --- | --- |
|  | 5 | 6 | 3 | 4 | 5 |
| Printed State (with an eye) | ○ | ○ | X | Δ | ○ |

○: Good.
Δ: Slightly repelled.
X: Largely repelled and whitish throughout the surface.

As described in the foregoing pages, according to the production method of the present invention, a sand-blast processing using a powder class abrasive and a brush-polishing treatment are performed, so that a frost-processed product having appearance and touch feeling equal to those of a product by the chemical frost processing and having a surface roughness within a specific range can be obtained. In particular, according to the present invention, a frosted glass product can be obtained by a method ensured with safe working and good labor safety and hygiene, free of any fear for environmental pollution and mild to the environment. Furthermore, according to the production method of the present invention, fine asperities can be formed and therefore, transfer paper printing can be used.

As such, the present invention can overcome all problems encountered in the conventional frost processing of this type and greatly contributes to the industry.

What is claimed:

1. A method for producing a frosted glass product, said method comprising the steps of:
    sand-blasting a glass surface using an abrasive having a grain size of less than #220 to form a sand-blasted surface, and
    brush-polishing said sand-blasted surface to produce a delustered glass surface having a surface roughness Ra in a range of approximately 0.4 μm and 1.2 μm.

2. The method for producing a frosted glass product as claimed in claim 1, which further comprises a step of water-washing said brush-polished surface.

3. The method for producing a frosted glass product as claimed in claim 1, wherein said brush-polishing treatment is performed while splashing water.

4. The method for producing a frosted glass product as claimed in claim 1, wherein the abrasive is $Al_2O_3$ or SiC having a grain size of #400 to #500.

5. The method for producing a frosted glass product as claimed in claim 2, wherein the abrasive is $Al_2O_3$ or SiC having a grain size of #400 to #500.

6. The method for producing a frosted glass product as claimed in claim 3, wherein the abrasive is $Al_2O_3$ or SiC having a grain size of #400 to #500.

7. A method for producing a frosted glass product, which is a method for obtaining a glass product having a delustered surface such that the surface roughness Ra of the glass is from 0.4 to 1.2 μm, said method comprising:
    a step of sand-blasting a glass surface using an abrasive having a grain size of less than #220, and
    a step of brush-polishing said sand-blasted surface, wherein said brush-polishing treatment is performed by a nylon brush having mixed thereinto an abrasive having a grain size of #320 to #500.

8. A method for producing a frosted glass product, which is a method for obtaining a glass product having a delustered surface such that the surface roughness Ra of the glass is from 0.4 to 1.2 μm, said method comprising:
    a step of sand-blasting a glass surface using an abrasive having a grain size of less than #220, and
    a step of brush-polishing said sand-blasted surface, and
    a step of water-washing said brush-polished surface, wherein said brush-polishing treatment is performed by a nylon brush having mixed thereinto an abrasive having a grain size of #320 to #500.

9. A method for producing a frosted glass product, which is a method for obtaining a glass product having a delustered surface such that the surface roughness Ra of the glass is from 0.4 to 1.2 μm, said method comprising:
    a step of sand-blasting a glass surface using an abrasive having a grain size of less than #220, and
    a step of brush-polishing said sand-blasted surface, wherein said brush-polishing treatment is performed while splashing water and said brush-polishing treatment is performed by a nylon brush having mixed thereinto an abrasive having a grain size of #320 to #500.

10. A method for producing a frosted glass product, which is a method for obtaining a glass product having a delustered surface such that the surface roughness Ra of the glass is from 0.4 to 1.2 μm, said method comprising:
    a step of sand-blasting a glass surface using an abrasive having a grain size of less than #220, and
    a step of brush-polishing said sand-blasted surface, wherein the abrasive is $Al_2O_3$ or SiC having a grain size of #400 to #500 and said brush-polishing treatment is performed by a nylon brush having mixed thereinto an abrasive having a grain size of #320 to #500.

11. A method for producing a frosted glass product, which is a method for obtaining a glass product having a delustered surface such that the surface roughness Ra of the glass is from 0.4 to 1.2 μm, said method comprising:
    a step of sand-blasting a glass surface using an abrasive having a grain size of less than #220,
    a step of brush-polishing said sand-blasted surface, and
    a step of water-washing said brush-polished surface wherein the abrasive is $Al_2O_3$ or SiC having a grain size of #400 to #500, and said brush-polishing treatment is performed by a nylon brush having mixed thereinto an abrasive having a grain size of #320 to #500.

12. A method for producing a frosted glass product, which is a method for obtaining a glass product having a delustered surface such that the surface roughness Ra of the glass is from 0.4 to 1.2 μm, said method comprising:
    a step of sand-blasting a glass surface using an abrasive having a grain size of less than #220, and
    a step of brush-polishing said sand-blasted surface, wherein said brush-polishing treatment is performed while splashing water, the abrasive is $Al_2O_3$ or SiC having a grain size of #400 to #500, and said brush-polishing treatment is performed by a nylon brush having mixed thereinto an abrasive having a grain size of #320 to #500.

* * * * *